United States Patent
Lee et al.

(10) Patent No.: US 8,546,019 B2
(45) Date of Patent: Oct. 1, 2013

(54) ELECTRODE ACTIVE MATERIAL FOR SECONDARY BATTERY AND METHOD FOR PREPARING THE SAME

(75) Inventors: Yongju Lee, Daejeon (KR); Jeyoung Kim, Daejeon (KR); Oujung Kwon, Daejeon (KR); Byung Hun Oh, Daejeon (KR); Insung Uhm, Daejeon (KR); Seungyoun Choi, Daejeon (KR)

(73) Assignee: LG Chem, Ltd. (KR)

( * ) Notice: Subject to any disclaimer, the term of this patent is extended or adjusted under 35 U.S.C. 154(b) by 125 days.

(21) Appl. No.: 13/130,153

(22) PCT Filed: Nov. 20, 2009

(86) PCT No.: PCT/KR2009/006846
§ 371 (c)(1),
(2), (4) Date: Jul. 22, 2011

(87) PCT Pub. No.: WO2010/058990
PCT Pub. Date: May 27, 2010

(65) Prior Publication Data
US 2011/0311875 A1 Dec. 22, 2011

(30) Foreign Application Priority Data

Nov. 20, 2008 (WO) ............... PCT/KR2008/006836
Nov. 24, 2008 (WO) ............... PCT/KR2008/006929

(51) Int. Cl.
*H01M 4/13* (2010.01)
*H01M 4/58* (2010.01)

(52) U.S. Cl.
USPC ................. 429/231.9; 429/231.95; 429/218.1

(58) Field of Classification Search
None
See application file for complete search history.

(56) References Cited

U.S. PATENT DOCUMENTS

| | | |
|---|---|---|
| 2002/0136955 A1 | 9/2002 | Park et al. |
| 2003/0053945 A1 | 3/2003 | Fukuoka et al. |
| 2005/0158546 A1 | 7/2005 | Shizuka |
| 2007/0224508 A1 | 9/2007 | Aramata et al. |
| 2008/0193831 A1 | 8/2008 | Mah et al. |

FOREIGN PATENT DOCUMENTS

| | | |
|---|---|---|
| EP | 0582173 A1 | 2/1994 |
| EP | 1057783 A2 | 12/2000 |
| JP | 05-151995 | 6/1993 |
| JP | 2003-160328 A | 6/2003 |

(Continued)

OTHER PUBLICATIONS

A machine translation of JP 2007-059213, retrieved from <http://www19.ipdl.inpit.go.jp/PA1/cgi-bin/PA1INDEX> on Mar. 12, 2013.*

(Continued)

*Primary Examiner* — Cynthia K. Walls
(74) *Attorney, Agent, or Firm* — Lerner, David, Littenberg, Krumholz & Mentlik, LLP (57) ABSTRACT

The disclosure relates to an electrode active material including: (a) first particulate of a metal (or metalloid) oxide alloyable with lithium; and (b) second particulate of an oxide containing lithium and the same metal (or metalloid) as that of the metal (or metalloid) oxide, and to a secondary battery including the electrode active material. When the electrode active material is used as an anode active material, reduced amounts of an irreversible phase such as a lithium oxide or a lithium metal oxide are produced during initial charge-discharge of a battery since lithium is already contained in the second particulate before the initial charge-discharge, and thus a dead volume on the side of the cathode can be minimized and a high-capacity battery can be fabricated.

19 Claims, 7 Drawing Sheets

(56) References Cited

FOREIGN PATENT DOCUMENTS

| | | |
|---|---|---|
| JP | 2005-183264 A | 7/2005 |
| JP | 2005-285545 A | 10/2005 |
| JP | 2007-059213 A | 3/2007 |
| KR | 20010056565 A | 7/2001 |
| KR | 20010066813 A | 7/2001 |
| KR | 20060009797 A | 2/2006 |
| KR | 100830612 | 5/2008 |
| WO | 2005119820 A1 | 12/2005 |

OTHER PUBLICATIONS

International Search Report, PCT/KR2009/006846, dated Jun. 18, 2010.

* cited by examiner

ELECTRODE ACTIVE MATERIAL FOR SECONDARY BATTERY AND METHOD FOR PREPARING THE SAME

CROSS REFERENCE TO RELATED APPLICATIONS

The present application is a national phase entry under 35 U.S.C. §371 of International Application No. PCT/KR2009/006846, filed Nov. 20, 2009, published in Korean, which claims priority from International Application No. PCT/KR2008/006836, filed Nov. 20, 2008, and International Application No. PCT/KR2008/006929, filed Nov. 24, 2008. The disclosures of said applications are incorporated by reference herein.

TECHNICAL FIELD

The present disclosure relates to an electrode active material for a secondary battery and a secondary battery including the electrode active material.

BACKGROUND ART

In a lithium secondary battery, materials allowing insertion and release of lithium ions are used as a cathode and an anode, and an organic electrolyte or a polymer electrolyte is charged between the cathode and the anode. When the lithium ions are inserted and released at the cathode and the anode, electrical energy is generated through oxidation and reduction reactions.

At present, carbonaceous materials are mainly used for the anode active material of a lithium secondary battery. However, in order to further improve the capacity of the lithium secondary battery, use of an electrode active material with a higher capacity is required.

To satisfy this requirement, metallic Si, Sn, etc., which exhibit higher charge-discharge capacity than the carbonaceous materials and are electrochemically alloyable with lithium, have been used as an electrode active material. However, these metallic electrode active materials tend to crack or pulverize because of severe volume change accompanied by charge and discharge of lithium. Accordingly, the capacity of a secondary battery using these metallic electrode active material declines rapidly with the progress of charge-discharge cycles and also the lifetime is reduced.

Thus, there has been an attempt to replace the metals such as Si, Sn, etc. with their oxides for use as an electrode active material, in order to reduce the cracking and pulverization problems. Although use of the metal oxide electrode active materials solves the problem, initial efficiency is lower as compared to the carbonaceous electrode active materials. Furthermore, during the initial reaction with lithium ions, an irreversible phase such as a lithium oxide or a lithium metal oxide is formed, resulting in further decline of initial efficiency than the metallic electrode active materials.

DISCLOSURE

Technical Problem

The inventors of the present disclosure have confirmed that an electrode active material including first particulate of a metal (or metalloid) oxide alloyable with lithium and second particulate of an oxide containing lithium and the same metal (or metalloid) as that of the metal (or metalloid) oxide may reduce the formation of an irreversible phase such as a lithium oxide or a lithium metal oxide during initial charge-discharge of a battery since lithium is already contained in the second particulate before the initial charge-discharge through reaction of lithium with the metal (or metalloid) oxide.

Further, they have found out that, when an oxygen-free lithium salt is used to prepare the electrode active material, reduction of initial efficiency during the initial charge-discharge of the battery may be prevented since additional inflow of oxygen into the metal (or metalloid) oxide during heat treatment can be prevented.

The present disclosure is based on the findings.

Technical Solution

In one general aspect, the present disclosure provides an electrode active material including: (a) first particulate of a metal (or metalloid) oxide alloyable with lithium; and (b) second particulate of an oxide containing lithium and the same metal (or metalloid) as that of the metal (or metalloid) oxide, and a secondary battery including the electrode active material.

In another general aspect, the present disclosure provides a method for preparing the electrode active material, including: chemically or mechanically mixing an oxygen-free lithium salt and a metal (or metalloid) oxide alloyable with lithium; and heat treating the resulting mixture under an inert atmosphere.

In another general aspect, the present disclosure provides a method for preparing the electrode active material, including: chemically or mechanically mixing an oxygen-free lithium salt and a metal (or metalloid) oxide alloyable with lithium; and mechanically alloying the resulting mixture.

Advantageous Effects

When an electrode active material according to the present disclosure is used as an anode active material, reduced amounts of an irreversible phase such as a lithium oxide or a lithium metal oxide are produced during initial charge-discharge of a battery since lithium is already contained in the second particulate before the initial charge-discharge, and thus a dead volume on the side of the cathode can be minimized and a high-capacity battery can be fabricated.

BEST MODE

Hereinafter, the embodiments of the present disclosure will be described in detail.

The present disclosure provides an electrode active material for a secondary battery comprising: first particulate of a metal (or metalloid) oxide alloyable with lithium; and second particulate of an oxide containing lithium and the same metal (or metalloid) as that of the metal (or metalloid) oxide.

When a metal (or metalloid) oxide alloyable with lithium such as SiO, SnO, etc. is used as an anode active material, an irreversible phase such as a lithium oxide or a lithium metal oxide is formed during initial charge-discharge of a battery due to the reaction of lithium ion ($Li^+$) inserted into the anode with the metal (or metalloid) oxide. Since the irreversible phase can surround the metal (or metalloid) such as Si, Sn, etc. and thus reduce the volume change of the metal (or metalloid), the electrode active material comprising the metal (or metalloid) oxide alloyable with lithium such as SiO, SnO, etc. experiences less cracking or pulverization caused by the volume change as compared to the electrode active material comprising the metal (or metalloid) such as Si, Sn, etc.

However, a battery having the electrode active material comprising the metal (or metalloid) oxide experiences deteriorated initial efficiency and capacity because lithium is consumed due to the formation of the irreversible phase such as the lithium oxide or the lithium metal oxide and an amount of usable lithium reduces. Especially, in the current secondary battery system wherein the lithium source is present at the cathode, the irreversible phase formed at the anode may result in increased dead volume at the anode if the irreversible capacity is large. As a result, the battery capacity is decreased since the capacity available at the cathode is reduced. In addition, the increased dead volume may decrease the battery life due to the low battery capacity and low charge-discharge efficiency at each cycle.

To solve these problems, metallic lithium such as lithium foil or lithium powder has been reacted with a metal (or metalloid) oxide when preparing the electrode active material or the metallic lithium has been coated on the surface of a previously-prepared metal (or metalloid) oxide electrode in order to inhibit the dead volume generation at the cathode due to the formation of the irreversible phase at the anode However, since metallic lithium is highly reactive with water and may ignite and forms lithium carbonate by reacting with carbon dioxide, it is not recommended to use metallic lithium when preparing the electrode active material. Moreover, since the heat generated during the reaction of the metallic lithium with the metal (or metalloid) oxide allows the sub-nanometer metal (or metalloid) phase grow into large metal (or metalloid) crystal phase, it is difficult to reduce volume change during the charge-discharge of the battery.

Thus, there has been an attempt to coat metallic lithium on the surface of an electrode comprising a metal (or metalloid) oxide and applying a pressure so that the metallic lithium is adhered well to the electrode surface, in order to use thus prepared electrode as an anode to inhibit the dead volume generation at the cathode.

Specifically, a battery using such an electrode as anode allows, when the lithium ion ($Li^+$) released from the cathode is inserted into the anode during charging, release of the lithium ion also from the metallic lithium present on the anode surface. Since the lithium ion released from the metallic lithium is inserted into the anode along with the lithium ion released from the cathode, the consumption of the lithium ion due to the formation of the irreversible phase resulting from the reaction of the lithium ion with the metal (or metalloid) oxide can be compensated for, and the dead volume generation at the cathode can be minimized.

However, such an electrode is not currently produced in large scale due to the safety problems such as the risk of ignition resulting from the reaction of the metallic lithium with water.

In addition, since the metallic lithium is simply present on the surface of the electrode comprising the metal (or metalloid) oxide, it cannot reduce the formation of the irreversible phase resulting from the reaction between lithium and the metal (or metalloid) oxide during battery charging. Moreover, the electrode active material of the conventional electrode comprises only the metal (or metalloid) oxide particulate and it does not comprise both the metal (or metalloid) and lithium as in the electrode active material of the present disclosure.

In contrast, the electrode active material according to the present disclosure comprises first particulate of an oxide of a metal (or metalloid), e.g., Si, Sn, etc., and second particulate of an oxide containing lithium and the same metal (or metalloid) as that of the metal (or metalloid) oxide. Thus, since lithium is already contained in the second particulate before the initial charge-discharge, the formation of the irreversible phase such as a lithium oxide or a lithium metal oxide during initial charge-discharge of a battery can be reduced and thus initial efficiency can be improved. Furthermore, since the dead volume generation at the cathode due to the formation of the irreversible phase at the anode can be minimized, the deterioration of battery capacity can be prevented. Accordingly, a secondary battery using the electrode active material according to the present disclosure may have high initial efficiency of about 50% or better as well as high capacity.

The metal (or metalloid) oxide of the first particulate may be any oxide of a metalloid or a metal alloyable with lithium, without special limitation, including Si, Sn, Al, Sb, Bi, As, Ge, Pb, Zn, Cd, In, Ga, etc.

Examples of the oxide containing the metal (or metalloid) and lithium of the second particulate include $Li_2SiO_3$, $Li_2SnO$, $Li_4SiO_4$, $Li_2Si_2O_5$, $Li_6Si_2O_7$, $Li_2Si_3O_7$, $Li_8SiO_6$, $Li_2SnO_3$, $Li_5AlO_4$, $LiAlO_2$, $LiAl_5O_8$, $LiSbO_3$, $LiSb_3O_8$, $Li_3SbO_4$, $Li_5SbO_5$, $Li_7SbO_6$, $LiSb_3O_8$, $Li_{0.62}Bi_{7.38}O_{11.38}$, $LiBiO_2$, $LiBiO_3$, $Li_3BiO_4$, $Li_5BiO_5$, $Li_7BiO_6$, $LiBi_{12}O_{18.50}$, $LiAsO_3$, $Li_3AsO_4$, $Li_4As_2O_7$, $Li_2GeO_5$, $Li_2Ge_4O_9$, $Li_2Ge_7O_{15}$, $Li_2GeO_3$, $Li_4Ge_5O_{12}$, $Li_4Ge_9O_{20}$, $Li_4GeO_4$, $Li_6Ge_2O_7$, $Li_8GeO_6$, $Li_2PbO_3$, $Li_4PbO_4$, $Li_8PbO_6$, $Li_6ZnO_4$, $LiInO_2$, $Li_3InO_3$, $LiGaO_2$, $LiGa_5O_8$, $Li_5GaO_4$, etc. But, without being limited thereto, any crystalline or amorphous oxide in which lithium is contained in the metal (or metalloid) may be used. By including the second particulate in the electrode active material, formation of the lithium oxide and the lithium metal oxide at the anode during the battery charge-discharge can be reduced and, thus, the dead volume generation at the cathode due to the initial irreversible phase can be minimized.

The first particulate of the metal (or metalloid) oxide and the second particulate of the oxide comprising the metal (or metalloid) as well as lithium may be mixed in the electrode active material. Preferably, the first particulate or aggregates of two of more of the first particulates are surrounded by the second particulate.

The first particulate may have an average particle size (diameter) from about 0.1 nm to 5 μm, and the second particulate may have an average particle size (diameter) from about 0.1 nm to 20 μm. The electrode active material comprising the first particulate and the second particulate of such size may have an average particle size (diameter) from about 0.1 to 100 μm, but without being limited thereto.

A secondary battery including the electrode active material of the present disclosure exhibits improved initial efficiency over the secondary battery including the existing electrode active material comprising only the metal (or metalloid) oxide particulate. For example, a secondary battery using an electrode active material comprising first particulate of SiO and second particulate of $Li_4SiO_4$ according to the present disclosure exhibits an initial efficiency of about 50% or greater, preferably 65% or greater, more preferably 70% or greater.

In addition, whereas the electrode active material comprising a metal such as Si, Sn, etc. shows volume change of about 400% or greater, the electrode active material of the present disclosure exhibits a smaller volume change of about 300% or less during charge-discharge of a battery.

Preferably, the first particulate and the second particulate may be included in a weight ratio of 5:95 to 95:5. When the weight proportion of the first particulate is too small, the electrode active material has a low capacity because of low reversible capacity. And, the lithium included in the second particulate may cause safety problems by, for example, reacting with water. When the weight proportion of the first particulate is too high, a large amount of an irreversible phase such as a lithium oxide or a lithium metal oxide may be produced during battery charge-discharge via reaction with lithium ions, thereby resulting in decreased initial efficiency.

The electrode active material of the present disclosure may be prepared by: chemically or mechanically mixing an oxygen-free lithium salt and a metal (or metalloid) oxide alloyable with lithium; and heat treating the mixture under an inert atmosphere.

The metal (or metalloid) oxide may be an oxide of any metal or metalloid alloyable with lithium, without special limitation. Non-limiting examples may include Si, Sn, Al, Sb, Bi, As, Ge, Pb, Zn, Cd, In, Ga and alloys thereof.

The lithium salt, which is mixed with the metal (or metalloid) oxide and forms the second particulate, may be an oxygen-free lithium salt. It is because, if the lithium salt contains oxygen, lithium oxide may be produced during the heat treatment and, thus, not only lithium but also oxygen may react with the metal (or metalloid) oxide, thereby resulting in decreased initial efficiency of the battery.

Non-limiting examples of the oxygen-free lithium salt include LiCl, $LiBF_4$, $LiAlCl_4$, LiSCN, $LiSbF_6$, $LiPF_6$, $LiAsF_6$, $LiB_{10}Cl_{10}$, LiF, LiBr and LiI.

When the oxygen-free lithium salt is mixed with the metal (or metalloid) oxide, the final molar ratio of the metal (or metalloid) (M) and oxygen (O) included in the electrode active material, M/0, becomes 1 or greater, more specifically from 1 to 10. As a result, the formation of the irreversible phase is reduced and the initial efficiency of the battery can be further improved.

Preferably, the oxygen-free lithium salt and the metal (or metalloid) oxide may be mixed at a weight ratio of 5:95 to 80:20. When the weight proportion of the oxygen-free lithium salt is too small, the second particulate comprising lithium may be produced in too small an amount due to the insufficient amount of the lithium to react with the metal (or metalloid) oxide. Then, the irreversible phase such as a lithium oxide or a lithium metal oxide may be produced in too large an amount from the reaction of the lithium ion inserted into the anode and the metal (or metalloid) oxide during initial charge-discharge of the battery. Consequently, the initial efficiency of the battery may not be improved as desired. And, when the weight proportion of the oxygen-free lithium salt is too large, the excessive amount of lithium included in the second particulate may cause safety problem of the battery. Also, the lithium exceeding the amount that can be included in the second particulate may precipitate.

The oxygen-free lithium salt and the metal (or metalloid) oxide alloyable with lithium may be mixed by chemical or mechanical mixing.

First, the chemical mixing may comprise: dispersing the metal (or metalloid) oxide in a solution prepared by dissolving the oxygen-free lithium salt in a solvent to prepare a dispersion; and drying the dispersion.

The solvent or dispersion medium for dissolving the oxygen-free lithium salt and dispersing the alloyable metal (or metalloid) oxide may be any one that can provide homogeneous dissolution and mixing and can be removed easily afterwards, without particular limitation. Non-limiting examples of the solvent or dispersion medium may include distilled water, alcohols such as ethanol, methanol, etc., acetone, tetrahydrofuran, methylene chloride, chloroform, dimethylformamide, N-methyl-2-pyrrolidone, cyclohexane, dichloromethane, dimethyl sulfoxide, acetonitrile, pyridine, amines, and mixtures thereof.

After dissolving the lithium salt in the solvent or dispersion medium, a dispersing apparatus commonly employed in the art may be used to disperse the metal (or metalloid) oxide and thus form the dispersion. The dispersing apparatus may be any apparatus that can disperse the material in the dispersion medium, without special limitation. Examples may include an ultrasonic dispersing apparatus, a magnetic stirring apparatus, a spray dryer apparatus, or the like.

Then, after removing the solvent or dispersion by drying the dispersion medium at room temperature (25-28° C.) or at 50-200° C., the mixture with the lithium salt formed on the surface of the metal (or metalloid) oxide may be obtained. The solvent or dispersion medium may be removed according to the methods known in the art.

The oxygen-free lithium salt and the metal (or metalloid) oxide alloyable with lithium may be homogeneously mixed also by mechanical mixing. As used herein, mechanical mixing refers to pulverizing and mixing particles desired to be mixed by applying mechanical force and thus forming a homogeneous mixture.

In general, mechanical mixing is performed using a mechanical mixing apparatus such as a high-energy ball mill, a planetary mill, a stirred ball mill, a vibrating mill, or the like. Process parameters such as rotation speed, ball-powder weight ratio, ball size, mixing time, mixing temperature, atmosphere, etc. may be varied depending on conditions. To attain a superior mixing efficiency, alcohols such as ethanol or higher fatty acids such as stearic acid may be added as a processing control agent. The processing control agent may be added in an amount of about 2.0 parts by weight or less, preferably 0.5 part by weight or less, based on 100 parts by weight of the mixture. The mixing time may be decreased by adding the processing control agent.

When the process parameters such as mixing time, mixing temperature, rotation speed, etc. are controlled such that the rotation speed is increased to about 100 rpm or higher in about 2 hours of mechanical mixing, mechanical alloying may be accomplished while the oxygen-free lithium salt and the metal (or metalloid) oxide alloyable with lithium are pulverized and mixed. Through this mechanical mixing and mechanical alloying, the electrode active material of the present disclosure may be obtained in the form of an alloy with a homogeneous composition. In this case, the heat treatment under an inert atmosphere may be unnecessary.

For example, after loading a mixture of the oxygen-free lithium salt and the metal (or metalloid) oxide in a ball mill apparatus together with balls having a diameter of about 5 mm, the mixture may be mechanical mixed and alloyed by rotating at room temperature. As a result of the ball milling, the mixture of the oxygen-free lithium salt and the metal (or metalloid) oxide may be pulverized and homogeneously mixed. By adjusting the rotation speed and mixing time, the electrode active material comprising a mixture of first particulate of the metal (or metalloid) oxide and second particulate of the oxide containing lithium and the same metal (or metalloid) as that of the metal (or metalloid) oxide can be obtained.

Specifically, the mixture of the oxygen-free lithium salt and the metal (or metalloid) oxide and the balls may be loaded in the ball mill apparatus at a weight ratio of 1:10-20. Outside this range, compressive stress may not be applied to the mixture or productivity may decrease because of unnecessarily excessive use of the balls.

The ball may be a stainless steel ball or a zirconia ball having a diameter of about 0.1 to 10 mm.

Specifically, the rotation speed may be about 300-3000 rpm. The rotation speed may be controlled adequately depending on whether the associated process is mechanical mixing or mechanical alloying.

The mechanical alloying time may be 30 minutes or longer, preferably 3-100 hours. Within this range, the electrode active material wherein the first particulate and the second particulate are mixed can be obtained. When the mechanical alloying time is too short, the mixture of the oxygen-free lithium salt and the metal (or metalloid) oxide may not be adequately pulverized or mixed and, as a result thereof, the first particulate and the second particulate may not be homogeneously mixed in the prepared electrode active material. And, when the mechanical alloying time is too long, impurities may be incorporated during the mechanical alloying, thereby deteriorating performance of the electrode active material.

When preparing the electrode active material by the mechanical mixing and/or the alloying, the mechanical mixing and/or alloying may be performed under an atmosphere where supply of oxygen is blocked. The atmosphere where supply of oxygen is blocked may be an inert atmosphere of nitrogen gas, hydrogen gas, argon gas, helium gas, krypton gas, xenon gas, etc. or a vacuum atmosphere, but without being limited thereto.

As the resulting mixture is heat treated in a reactor under an inert atmosphere, the metal (or metalloid) oxide reacts with the lithium of the lithium salt formed on the surface thereof and thus forms new bonding. As a result, a mixture of the alloyable metal (or metalloid) oxide and the oxide containing lithium and the same metal (or metalloid) as that of the metal (or metalloid) oxide is obtained. In this process, the anion of the lithium salt is released as gas.

The heat treating temperature may be any temperature between the melting point of the oxygen-free lithium salt and the boiling point of the lithium salt, without special limitation. The heat treating temperature may be different depending on the particular oxygen-free lithium salt. When the heat treating temperature is below the melting point of the lithium salt, the reaction between the lithium salt and the metal (or metalloid) oxide may not occur. And, when the temperature is above the boiling point of the lithium salt, the lithium salt may be released as gas before it sufficiently reacts with the metal (or metalloid) oxide. Accordingly, an appropriate range of the heat treating temperature is from 500 to 2000° C.

For example, when a mixture of LiCl as the oxygen-free lithium salt and SiO as the metal (or metalloid) oxide is heat treated, a temperature of 1300° C. or below is preferred. It is because SiO tends to form $SiO_2$ and SiO and then grow at temperatures above 1300° C., making it difficult to control the thickness of SiO. Accordingly, the heat treating temperature may be determined considering the kinds of metal (or metalloid) oxide.

The heat treatment of the mixture may be performed under an inert atmosphere of nitrogen gas, hydrogen gas, argon gas, helium gas, krypton gas, xenon gas, etc. where supply of oxygen is blocked. When the mixture contacts oxygen during the heat treatment, lithium and oxygen may react together with the metal (or metalloid) oxide to form a lithium oxide or a lithium metal oxide. As a result, improvement of the initial efficiency of the battery may decrease.

In the present disclosure, an electrode may be prepared according to a method commonly employed in the art. For example, after mixing the electrode active material of the present disclosure with a binder, a solvent and, optionally, a conductivity enhancer and a dispersant and stirring to prepare a slurry, the slurry may be applied on a metallic current collector and then compressed and dried to prepare the electrode.

The binder may be used in an amount of 1-10 parts by weight based on 100 parts by weight of the electrode active material, and the conductivity enhancer may be used in an amount of 1-30 parts by weight based on 100 parts by weight of the electrode active material.

The binder may be an aqueous binder such as polytetrafluoroethylene (PTFE), polyvinylidene fluoride (PVDF), polyvinyl acetate, polyethylene oxide, polypyrrolidone, polyvinyl alcohol, polyacrylonitrile, polyacrylic acid (FAA), carboxymethyl cellulose (CMC), and styrene-butadiene rubber (SBR).

Usually, carbon black may be used as the conductivity enhancer. Commercially available products marketed as the conductivity enhancer include Acetylene Black (Chevron Chemical or Gulf Oil Company), Ketjen Black EC (Armak Company), Vulcan XC-72 (Cabot Company), Super P (MMM), etc. Also, linear conductivity enhancers such as carbon nanotube, carbon (nano)fiber, etc. may be used.

The metallic current collector may be any one made of a highly conductive metal, allowing easy attachment of the slurry of the electrode active material and having no reactivity within the voltage range of the battery. Typical examples include meshes and foils prepared from copper, gold, nickel and combinations thereof.

The method for applying the slurry on the current collector is not particularly limited. For example, doctor blading, dipping, brushing, or the like may be employed. The application amount is also not specifically limited, but may be such an amount that the thickness of the active material layer remaining after removal of the solvent or dispersion medium is generally about 0.005-5 mm, preferably 0.05-2 mm.

Also, the method for removing the solvent or dispersion medium is not specifically limited, but such a method that allows evaporation of the solvent or dispersion medium as soon as possible without cracking of the active material layer due to concentration of stress or peeling of the active material layer from the current collector. As a non-limiting example, drying may be performed in a vacuum oven of 50-200° C. for 0.5 to 3 days.

The electrode active material of the present disclosure can be used for any device for electrochemical reactions. For example, it can be used for all kinds of primary batteries, secondary batteries, fuel cells, solar cells, or capacitors. Preferably, it can be used for secondary batteries.

The secondary battery of the present disclosure may be fabricated using the electrode comprising the electrode active material of the present disclosure according to a method known in the art. For example, it may be prepared by interposing a porous separator between the cathode and the anode and then adding an electrolyte thereto. The secondary battery includes a lithium ion secondary battery, a lithium polymer secondary battery, a lithium ion polymer secondary battery, or the like.

The electrolyte may include a nonaqueous solvent and an electrolyte salt.

The nonaqueous solvent may be a nonaqueous solvent commonly used for a nonaqueous electrolyte, without special limitation. For example, cyclic carbonate, linear carbonate, lactone, ether, ester, ketone, etc. may be used.

Examples of the cyclic carbonate include ethylene carbonate (EC), propylene carbonate (PC), butylene carbonate (BC), etc., and examples of the linear carbonate include diethyl carbonate (DEC), dimethyl carbonate (DMC), dipropyl carbonate (DPC), ethylmethyl carbonate (EMC), methylpropyl carbonate (MPC), etc. Examples of the lactone include γ-butyrolactone (GBL), and examples of the ether include dibutyl ether, tetrahydrofuran, 2-methyltetrahydrofuran, 1,4-dioxane, 1,2-dimethoxyethane, etc. Examples of the ester include n-methyl acetate, n-ethyl acetate, methyl propionate, ethyl propionate, propyl propionate, butyl propionate, methyl pivalate, etc., and examples of the ketone include polymethyl vinyl ketone. These nonaqueous solvents may be used either alone or in combination.

The electrolyte salt is not specifically limited as long as it is generally used as an electrolyte salt for a nonaqueous electrolyte. Non-limiting examples of the electrolyte salt include salts having a structure of $A^+B^-$, wherein $A^+$ represents an alkali metal cation such as $Li^+$, $Na^+$, $K^+$ or a combination thereof, and $B^-$ represents an anion such as $PF_6^-$, $BF_4^-$, $Cl^-$, $Br^-$, $I^-$, $ClO_4^-$, $AsF_6^-$, $CH_3CO_2^-$, $CF_3SO_3^-$, $N(CF_3SO_2)_2^-$, $C(CF_2SO_2)_2^-$ or a combination thereof. Preferably, a lithium salt may be used. These electrolyte salts may be used alone or in combination.

The secondary battery of the present disclosure may include a separator. The separator is not specifically limited, but may be a porous separator. Non-limiting examples include polypropylene-, polyethylene- and polyolefin-based porous separators.

Although the shape of the secondary battery of the present disclosure is not particularly limited, it can have a cylindrical shape, a square shape, a pouch shape or a coin shape.

[Mode for Invention]

The examples and experiments will now be described. The following examples and experiments are for illustrative purposes only and not intended to limit the scope of the present disclosure.

In the followings, parts by weight are based on 100 parts by weight of a mixture of an (oxygen-free) lithium salt and a metal (or metalloid) oxide.

EXAMPLE 1

Figure 1:
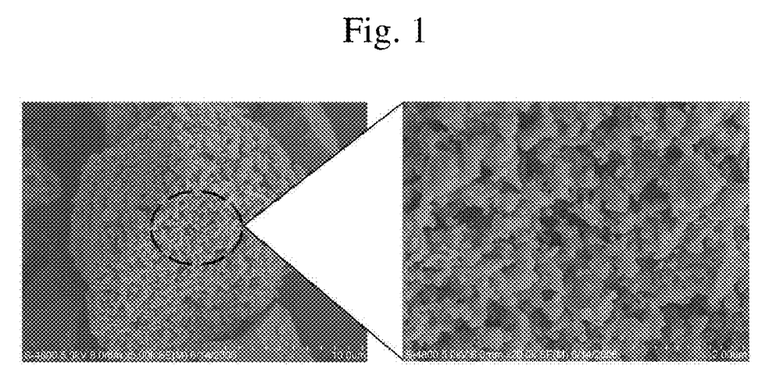
FIG. 1 is a scanning electron microscopy (SEM) image of an electrode active material prepared in Example 1.

After dissolving 50 parts by weight of lithium chloride (LiCl) in ethanol, 50 parts by weight of silicon monoxide (SiO) was uniformly dispersed to prepare a dispersion. The resulting dispersion was heated to 70° C. to remove the solvent from the mixture. The resulting mixture was heat treated at 800° C. under a nitrogen atmosphere to prepare an electrode active material. FIG. 1 is a scanning electron microscopy (SEM) image of the prepared electrode active material.

Thus prepared electrode active material powder was mixed with polyvinylidene fluoride (PVDF) as a binder and Acetylene Black as a conductivity enhancer at a weight ratio of 85:10:5. Then, after adding N-methyl-2-pyrrolidone (NMP) as a solvent, the mixture was mixed to prepare a homogeneous electrode slurry. The prepared electrode slurry was coated on one side of a copper (Cu) current collector to a thickness of 65 μm. After drying, pressing and punching to a desired size, an electrode was prepared.

Ethylene carbonate (EC) and diethyl carbonate (DEC) were mixed at a volume ratio of 30:70. To the resulting nonaqueous electrolyte solvent, 1 M $LiPF_6$ was added to prepare a nonaqueous electrolyte.

A coin-shaped battery was prepared by interposing a polyolefin separator between the electrode prepared above as an anode and a Li metal foil as a counter electrode and then injecting the electrolyte.

EXAMPLE 2

An electrode active material and a battery were prepared in the same manner as in Example 1, except for using 80 parts by weight of lithium chloride and 20 parts by weight of silicon monoxide instead of 50 parts by weight of lithium chloride and 50 parts by weight of silicon monoxide.

EXAMPLE 3

An electrode active material and a battery were prepared in the same manner as in Example 1, except for using 76 parts by weight lithium iodide (LiI) as an oxygen-free lithium salt instead of 50 parts by weight of lithium chloride.

EXAMPLE 4

An electrode active material and a battery were prepared in the same manner as in Example 1, except for using 25 parts by weight of lithium chloride and 75 parts by weight of tin monoxide (SnO) instead of 50 parts by weight of lithium chloride and 50 parts by weight of silicon monoxide.

COMPARATIVE EXAMPLE 1

Figure 2:
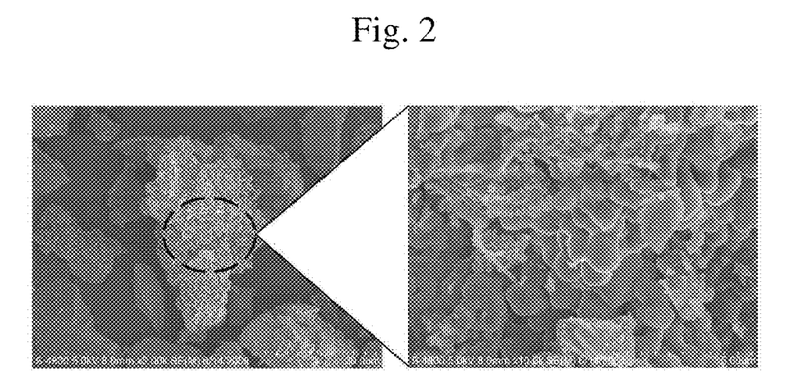
FIG. 2 is an SEM image of an electrode active material prepared in Comparative Example 1.

An electrode active material and a battery were prepared in the same manner as in Example 1, except for using 47 parts by weight of lithium carbonate ($Li_2CO_3$) and 53 parts by weight of silicon monoxide instead of 50 parts by weight of lithium chloride and 50 parts by weight of silicon monoxide. FIG. 2 is an SEM image of the prepared electrode active material.

COMPARATIVE EXAMPLE 2

An electrode active material and a battery were prepared in the same manner as in Example 1, except for heat treating 100 parts by weight of silicon monoxide at 800° C. instead of heat treating a mixture of 50 parts by weight lithium chloride and 50 parts by weight of silicon monoxide.

COMPARATIVE EXAMPLE 3

A battery was prepared in the same manner as in Example 1, except for using 100 parts by weight of heat-untreated silicon monoxide instead of an electrode active material prepared by heat treating a mixture of lithium chloride and silicon monoxide.

Figure 3:
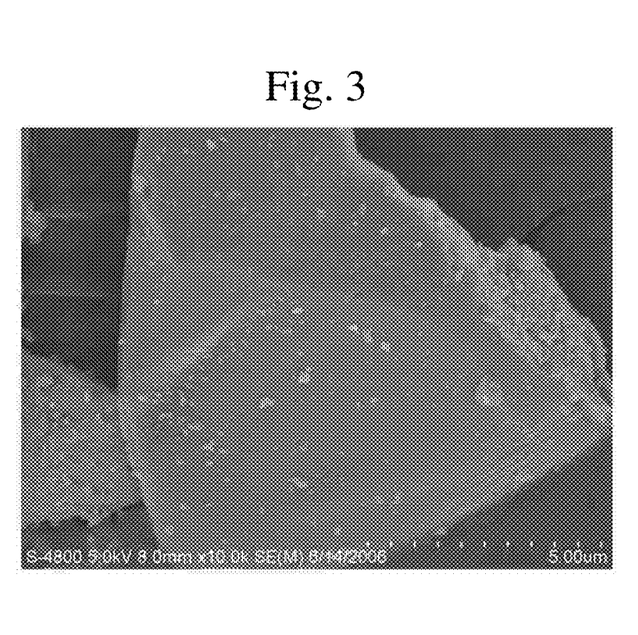
FIG. 3 is an SEM image of SiO used in Comparative Example 3.

FIG. 3 is an SEM image of the prepared electrode active material.

COMPARATIVE EXAMPLE 4

An electrode active material and a battery were prepared in the same manner as in Example 1, except for using 36 parts by weight of lithium hydroxide (LiOH) as an oxygen-containing lithium salt and 64 parts by weight of silicon monoxide instead of 50 parts by weight of lithium chloride and 50 parts by weight of silicon monoxide.

COMPARATIVE EXAMPLE 5

An electrode active material and a battery were prepared in the same manner as in Example 1, except for heat treating 100 parts by weight of tin monoxide at 800° C. instead of heat treating a mixture of 50 parts by weight lithium chloride and 50 parts by weight of silicon monoxide.

COMPARATIVE EXAMPLE 6

A battery was prepared in the same manner as in Example 1, except for using 100 parts by weight of heat-untreated tin monoxide instead of an electrode active material prepared by heat treating a mixture of 50 parts by weight lithium chloride and 50 parts by weight silicon monoxide.

TEST EXAMPLE 1

Charge-Discharge Characteristics of Battery

Charge-discharge characteristics of the batteries prepared in Examples 1-4 and Comparative Examples 1-6 were measured for 1 cycle. The result is shown in Table 1 and FIG. 4. Charging and discharging were performed under the condition described below. Also, the molar ratio (a:b) of first particulate (a) and second particulate (b) in the electrode active material and the molar ratio (M:O) of the metal (or metalloid) (M, M=Si or Sn) and oxygen (O) in the electrode active material were measured.

-Battery Charging/Discharging Condition-

Battery charging: The battery was charged under constant current until 5 mV, and then under constant voltage reaches to 0.005 C at 5 mV.

Battery discharging: The battery was discharged under constant current until 1.0 V.

TABLE 1

| | a:b molar ratio | Discharging capacity (mAh/g) | Charging capacity (mAh/g) | Initial efficiency (%) | M:O molar ratio |
|---|---|---|---|---|---|
| Ex. 1 | 55:45 | 1680 | 2174 | 78.2 | 1:1 |
| Ex. 2 | 13:87 | 1580 | 1734 | 91.1 | 1:1 |
| Ex. 3 | 57:43 | 1655 | 2108 | 78.5 | 1:1 |
| Ex. 4 | 48:52 | 848 | 1201 | 70.5 | 1:1 |
| Comp. Ex. 1 | 54:46 | 1430 | 2677 | 52.3 | 1:2 |
| Comp. Ex. 2 | 100:0 | 1745 | 2710 | 64.4 | 1:1 |
| Comp. Ex. 3 | 100:0 | 1750 | 2713 | 64.5 | 1:1 |
| Comp. Ex. 4 | 55:45 | 1427 | 2718 | 52.5 | 1:2 |
| Comp. Ex. 5 | 100:0 | 873 | 1556 | 56.1 | 1:1 |
| Comp. Ex. 6 | 100:0 | 870 | 1548 | 56.2 | 1:1 |

Figure 4:
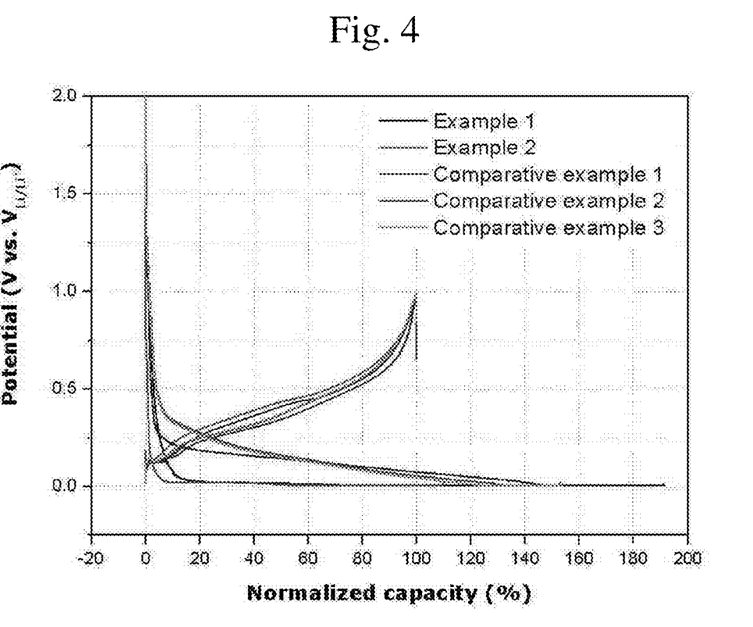
FIG. 4 shows charge-discharge curves of secondary batteries prepared in Examples 1-2 and Comparative Examples 1-3.

1) As seen from Table 1 and FIG. 4, the secondary battery prepared in Example 1 showed a decreased charging capacity but about 14% improved initial efficiency as compared to the battery prepared in Comparative Example 2 or 3. Also, the secondary battery prepared in Example 4 exhibited improved initial efficiency as compared to the battery prepared in Comparative Example 5 or 6. Therefore, it can be seen that when SiO and oxygen-free LiCl are mixed and then heat treated, the formation of the irreversible phase during charge-discharge of the battery caused by the reaction between lithium ion and SiO is reduced.

2) Also, the secondary battery prepared in Example 1 (using the oxygen-free lithium salt LiCl) and the secondary battery prepared in Example 3 (using the oxygen-free lithium salt LiI) showed much higher initial efficiency as well as increased discharging capacity when compared with the secondary battery prepared in Comparative Example 1 (using the oxygen-containing lithium salt $Li_2CO_3$) or the secondary battery prepared in Comparative Example 4 (using the oxygen-containing lithium salt LiOH). And, as a result of quantifying the metal (or metalloid) (M, M=Si or Sn) and oxygen (O) included in the electrode active material, the electrode active material of Example 1 had an Si:O ratio of 1:1, with a lower oxygen content than the electrode active materials of Comparative Examples 1 and 4 (Si:O=1:2). Therefore, it can be seen that when an oxygen-free lithium salt is used, initial efficiency and discharging capacity are improved since lithium and oxygen are not introduced into SiO during the heat treatment.

3) When comparing the secondary battery of Comparative Example 2 (using heat-treated SiO) with the secondary battery of Comparative Example 3 (using heat-untreated SiO), and the secondary battery of Comparative Example 5 (using heat-treated SnO) with the secondary battery of Comparative Example 6 (using heat-untreated SnO) respectively, the initial efficiency and charging/discharging capacity were almost similar. Therefore, it can be seen that heat treatment of SiO or SnO does not affect the charge-discharge characteristics of a battery.

TEST EXAMPLE 2

Bonding Structure of Electrode Active Material

Si nuclear magnetic resonance (NMR) spectroscopy, Li-NMR spectroscopy and X-ray diffractometry (XRD) were performed to investigate the bonding structure of the electrode active material of the present disclosure. The electrode active material prepared in Example 1 was compared with the heat-treated SiO of Comparative Example 2 as control 1, the heat-untreated SiO of Comparative Example 3 as control 2, and LiCl as control 3. The result is shown in FIGS. 5-7.

Figure 5:
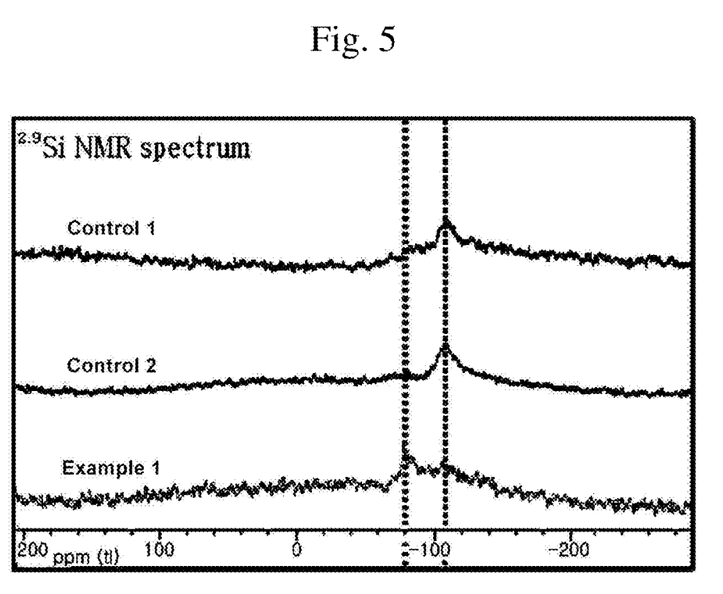
FIG. 5 shows Si nuclear magnetic resonance (NMR) spectra of an electrode active material prepared in Example 1, heat-treated SiO used in Comparative Example 2, and heat-untreated SiO used in Comparative Example 3.

1) As seen from FIG. 5, although control 1 (heat-treated SiO) and control 2 (heat-untreated SiO) show the same Si-NMR peaks at the same positions, the electrode active material prepared in Example 1 show a peak at a position different from that of control 2 (heat-untreated SiO). It reveals that the Si-NMR peak change of the electrode active material prepared in Example 1 is not due to heat treatment but the bonding of SiO to a different substance.

Figure 6:
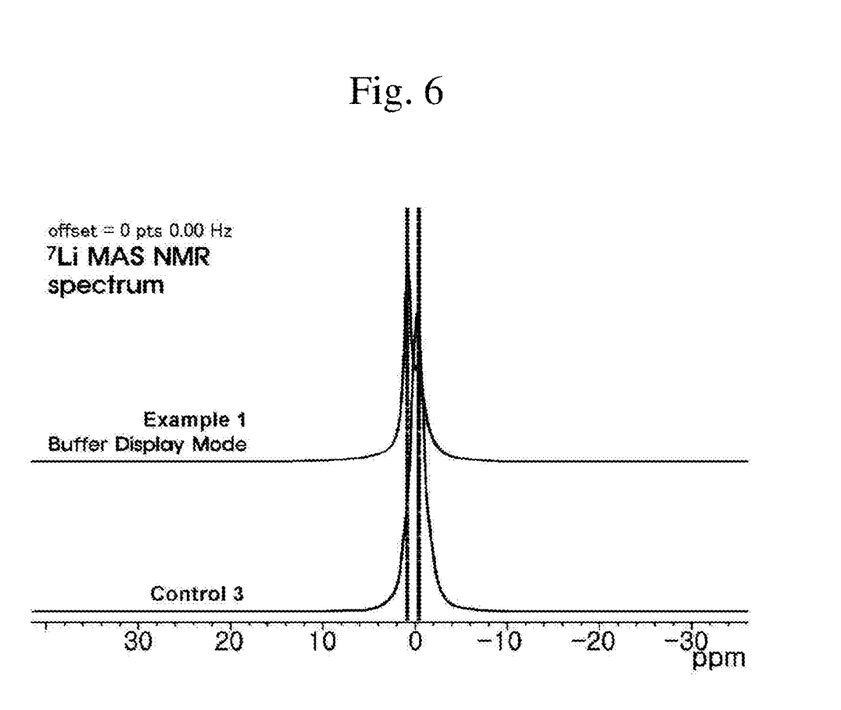
FIG. 6 shows Li-NMR spectra of an electrode active material prepared in Example 1 and LiCl as control 3.

2) Also, as seen from FIG. 6, the electrode active material prepared in Example 1 showed a Li-NMR peak at a different position from that of control 3 (LiCl). The chlorine content of the electrode active material of Example 1 was measured at about 50 ppm. Therefore, it was revealed that the lithium present in the electrode active material of Example 1 does not exist as LiCl.

Figure 7:
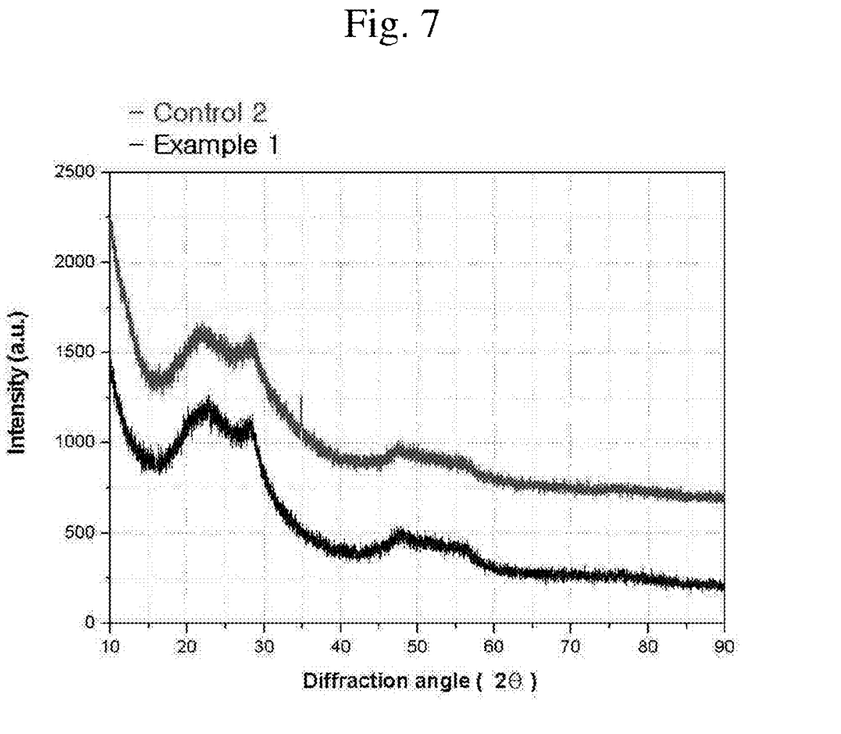
FIG. 7 shows X-ray diffraction (XRD) spectra of an electrode active material prepared in Example 1 and control 2 (heat-untreated SiO used in Comparative Example 3).

3) In addition, as seen from FIG. 7, the electrode active material prepared in Example 1 showed the same XRD peak patterns as control 2 (SiO), with no peak at different positions. In particular, the peaks occurring between 20 and 30° are the characteristic peaks observed from the SiO nanostructure. The peaks were also observed from the electrode active material prepared in Example 1. A crystalline material may show such peaks. However, the crystal grain size of the electrode active material of Example 1 and control 2 is calculated to be about 5 nm or smaller from the peak widths. Such a small crystal grain size reveals that the electrode active material of Example 1 is not crystalline but amorphous. The XRD revealed that not only the first particulate of the metal (or metalloid) oxide but also the second particulate of the oxide containing the metal (or metalloid) and lithium are amorphous.

4) To conclude, it can be seen that lithium is chemically bonded to SiO in the electrode active material of Example 1.

The present application contains subject matter related to International Patent Application No. PCT/KR2008/006836 and PCT/KR2008/006929 filed on Nov. 20, 2008 and Nov. 24, 2008 respectively, the entire contents of which is incorporated herein by reference.

Those skilled in the art will appreciate that the conceptions and specific embodiments disclosed in the foregoing description may be readily utilized as a basis for modifying or designing other embodiments for carrying out the same purposes of the present disclosure. Those skilled in the art will also appreciate that such equivalent embodiments do not depart from the spirit and scope of the disclosure as set forth in the appended claims.

The invention claimed is:

1. An electrode active material comprising:
    a first particulate of a metal (or metalloid) oxide alloyable with lithium; and
    a second particulate of an oxide containing lithium and the same metal (or metalloid) as that of the metal (or metalloid) oxide, wherein the first particulate has an average particle size (diameter) from 0.1 nm to 5 μm, and the second particulate has an average particle size (diameter) from 0.1 nm to 20 μm.

2. The electrode active material according to claim 1, wherein the first particulate and the second particulate are mixed in the electrode active material.

3. The electrode active material according to claim 1, wherein the first particulate or aggregates of two or more of the first particulates are surrounded by the second particulate.

4. The electrode active material according to claim 1, wherein the first particulate and the second particulate are included in a weight ratio of 5:95 to 95:5.

5. The electrode active material according to claim 1, wherein a molar ratio of the metal (or metalloid) (M) and oxygen (O) included in the electrode active material, M/O, is 1 or greater.

6. The electrode active material according to claim 1, wherein the metal (or metalloid) of the metal (or metalloid) oxide of the first particulate is selected from a group consisting of Si, Sn, Al, Sb, Bi, As, Ge, Pb, Zn, Cd, In, Ga and alloys thereof.

7. The electrode active material according to claim 1, wherein the oxide containing the metal (or metalloid) and lithium of the second particulate is selected from a group consisting of $Li_2SiO$, $Li_2SnO$, $Li_4SiO_4$, $Li_2Si_2O_5$, $Li_6Si_2O_7$, $Li_2Si_3O_7$, $Li_8SiO_6$, $Li_2SnO_3$, $Li_5AlO_4$, $LiAlO_2$, $LiAl_5O_8$, $LiSbO_3$, $LiSb_3O_8$, $Li_3SbO_4$, $Li_5SbO_5$, $Li_7SbO_6$, $LiSb_3O_8$, $Li_{0.62}Bi_{7.38}O_{11.38}$, $LiBiO_2$, $LiBiO_3$, $Li_3BiO_4$, $Li_5BiO_5$, $Li_7BiO_6$, $LiBi_{12}O_{18.50}$, $LiAsO_3$, $Li_3AsO_4$, $Li_4As_2O_7$, $Li_2GeO_5$, $Li_2Ge_4O_9$, $Li_2Ge_7O_{15}$, $Li_2GeO_3$, $Li_4Ge_5O_{12}$, $Li_4Ge_9O_{20}$, $Li_4GeO_4$, $Li_6Ge_2O_7$, $Li_8GeO_6$, $Li_2PbO_3$, $Li_4PbO_4$, $Li_8PbO_6$, $Li_6ZnO_4$, $LiInO_2$, $Li_3InO_3$, $LiGaO_2$, $LiGa_5O_8$, and $Li_5GaO_4$.

8. The electrode active material according to claim 1, wherein the oxide containing the metal (or metalloid) and lithium of the second particulate is crystalline, amorphous, or both.

9. The electrode active material according to claim 1, wherein the electrode active material is an anode active material.

10. A secondary battery comprising the electrode active material according to claim 1.

11. The secondary battery according to claim 10, which has an initial efficiency of 50% or greater.

12. A method for preparing the electrode active material according to claim 1, comprising:
    chemically or mechanically mixing an oxygen-free lithium salt and a metal (or metalloid) oxide alloyable with lithium;
    heat treating the resulting mixture under an inert atmosphere at a temperature between the melting point of the oxygen-free lithium salt and the boiling point of the oxygen-free lithium salt, or mechanically alloying the resulting mixture; and
    forming a first particulate of the metal (or metalloid) oxide alloyable with lithium; and a second particulate of an oxide containing lithium and the same metal (or metalloid) as that of the metal (or metalloid) oxide, wherein the first particulate has an average particle size (diameter) from 0.1 nm to 5 μm, and the second particulate has an average particle size (diameter) from 0.1 nm to 20 μm.

13. The method for preparing an electrode active material according to claim 12, wherein the oxygen-free lithium salt is selected from a group consisting of LiCl, $LiBF_4$, $LiAlCl_4$, LiSCN, $LiSbF_6$, $LiPF_6$, $LiAsF_6$, $LiB_{10}Cl_{10}$, LiF, LiBr and LiI.

14. The method for preparing an electrode active material according to claim 12, wherein the metal (or metalloid) of the metal (or metalloid) oxide of the first particulate is selected from a group consisting of Si, Sn, Al, Sb, Bi, As, Ge, Pb, Zn, Cd, In, Ga and alloys thereof.

15. The method for preparing an electrode active material according to claim 12, wherein the oxygen-free lithium salt and the metal (or metalloid) oxide are mixed at a weight ratio of 5:95 to 80:20.

16. The method for preparing an electrode active material according to claim 12, wherein the chemical mixing comprises: dispersing the metal (or metalloid) oxide in a solution prepared by dissolving the oxygen-free lithium salt in a solvent to prepare a dispersion; and drying the dispersion.

17. The method for preparing an electrode active material according to claim 12, wherein the mechanical mixing is performed using a ball mill, a planetary mill, a stirred ball mill or a vibrating mill.

18. The method for preparing an electrode active material according to claim 12, wherein the heat treatment is performed at 500-2000 ° C.

19. The method for preparing an electrode active material according to claim 12, wherein the mechanical alloying is performed using a ball mill, a planetary mill, a stirred ball mill or a vibrating mill.

* * * * *